United States Patent [19]

Snyder, Jr. et al.

[11] 3,719,556
[45] March 6, 1973

[54] NUCLEAR FUEL DEBRIS RETENTION STRUCTURE

[75] Inventors: Harold J. Snyder, Jr., Danville; Ralph W. Guenther, San Jose, both of Calif.

[73] Assignee: The United States of America as represented by the United States Energy Commission

[22] Filed: Dec. 2, 1971

[21] Appl. No.: 204,267

[52] U.S. Cl. ..........................176/38, 176/40, 176/87
[51] Int. Cl. ...............................................G21c 9/00
[58] Field of Search........................176/37, 38, 87, 40

[56] References Cited

UNITED STATES PATENTS

| | | | |
|---|---|---|---|
| 3,629,064 | 12/1971 | Zivi | 176/38 |
| 3,398,050 | 8/1968 | Yevick et al. | 176/17 |

Primary Examiner—Reuben Epstein
Attorney—Roland A. Anderson

[57] ABSTRACT

A nuclear fuel debris retention structure which accommodates the dispersion, collection and cooling of the fuel debris resulting from a nuclear accident. The structure includes features which: (1) provides for the disbursement of fuel debris by expulsion action of entrapped sodium, (2) provides all-around cooling for chunks of debris, (3) provides for radial disbursement by the contour and direction of the grid vanes, (4) provides separate cooling to the primary structural support, and (5) allows for the accumulation of finer debris and molten materials due to the shape of the grids.

10 Claims, 6 Drawing Figures

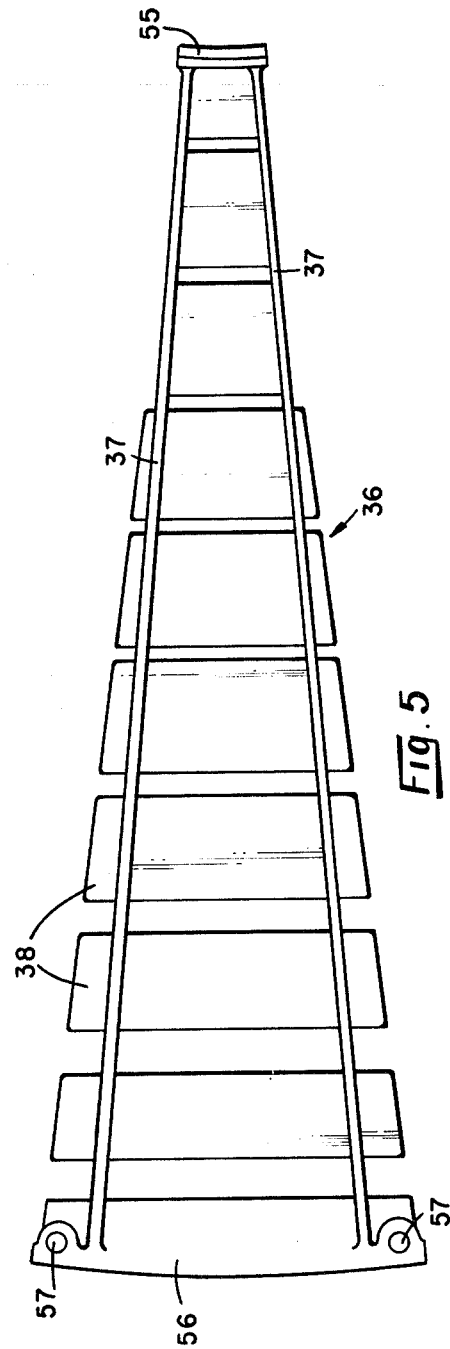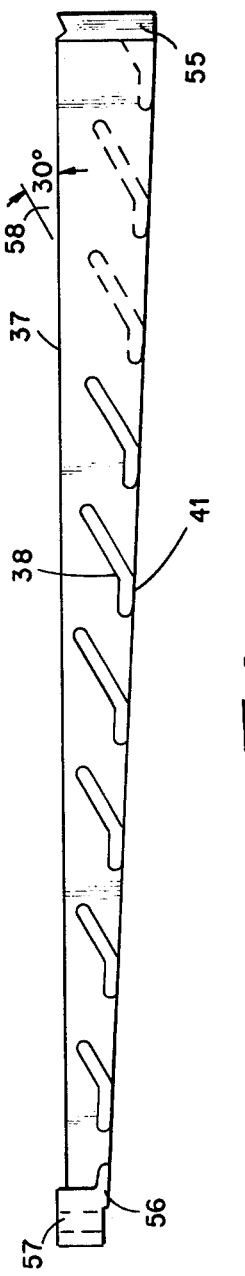

NUCLEAR FUEL DEBRIS RETENTION STRUCTURE

BACKGROUND OF THE INVENTION

The invention described herein was made in the course of, or under, USAEC Contract No. AT(04–3)-830 with the United States Atomic Energy Commission.

This invention relates to nuclear reactors, particularly to debris retention structure for nuclear reactors, and more particularly to such retention structure which accommodates the dispersion, collection and cooling of the nuclear fuel debris for preventing nuclear criticality of the debris and penetration of the primary containment tank thereby.

One possible consequence of a nuclear accident in a liquid metal fast breeder reactor, for example, is the melt down of fuel elements which comprise the reactor core. This molten fuel consists of uranium and plutonium in the form of oxides, carbides, or nitrides. The fuel continues to generate heat following the accident due to the decay of retained fission products produced in the normal power operation of the reactor. Sufficient heat is produced in the molten fuel to cause it to melt through the reactor assembly, which normally provides support.

Various approaches have been developed in the prior art to overcome such a consequence of a nuclear accident, as exemplified in U.S. Pat. No. 3,168,445, issued Feb. 2, 1965 to A. Ziegler et al, and U.S. Pat. No. 3,398,050, issued Aug. 20, 1968 to J. G. Yevick et al.

SUMMARY OF THE INVENTION

The present invention is directed to a nuclear fuel debris retention structure for fuel fragments and molten droplets resulting from a nuclear accident. The novel debris retention structure accommodates the dispersion, collection and cooling of the fuel debris in a configuration that provides adequate cooling, prevents nuclear criticality, and prevents a penetration of the primary containment tank by the fuel debris.

Therefore, it is an object of this invention to provide a nuclear fuel debris retention structure.

A further object of the invention is to provide a debris retention structure which accommodates the dispersion, collection and cooling of nuclear fuel debris resulting from a nuclear accident.

Another object of the invention is to provide a retention structure which accomplishes the disbursement of fuel debris by the expulsion action of the vaporization of entrapped sodium within indentations of a cusp shaped impingement cone.

Another object of the invention is to provide a nuclear fuel retention structure which includes a grid structure that provides for nearly all-around cooling for larger chunks of falling fuel debris.

Another object of the invention is to provide a nuclear fuel retention structure which includes grid vanes having contour and direction to provide for radial disbursement of the falling fuel debris.

Another object of the invention is to provide a nuclear fuel retention structure having grids shaped to allow for the accumulation of finer debris and molten material taking advantage of the angle of repose of the material in such a way as to provide adequate cooling by natural convection.

Another object of the invention is to provide a nuclear fuel debris retention structure which provides separate cooling to primary structural supporting members to guarantee structural integrity.

Other objects of the invention, not specifically set forth above will become readily apparent from the following description and accompanying drawings.

BRIEF DESCRIPTION OF THE DRAWINGS

FIG. 5 is an enlarged plan view of the grid member of FIG. 2 structure; and

FIG. 6 is a side view, partially in cross-section of the FIG. 5 grid member.

DESCRIPTION OF THE INVENTION

Briefly, the present invention is directed to a nuclear fuel debris retention structure for fuel fragments and molten droplets resulting from a nuclear accident. The structure has features including an impingement cone and multi-vane structure which accommodate the dispersion, collection and cooling of the fuel debris in a configuration that provides adequate cooling, prevents nuclear criticality, and prevents a penetration of the primary containment tank by the fuel debris.

Figure 1:
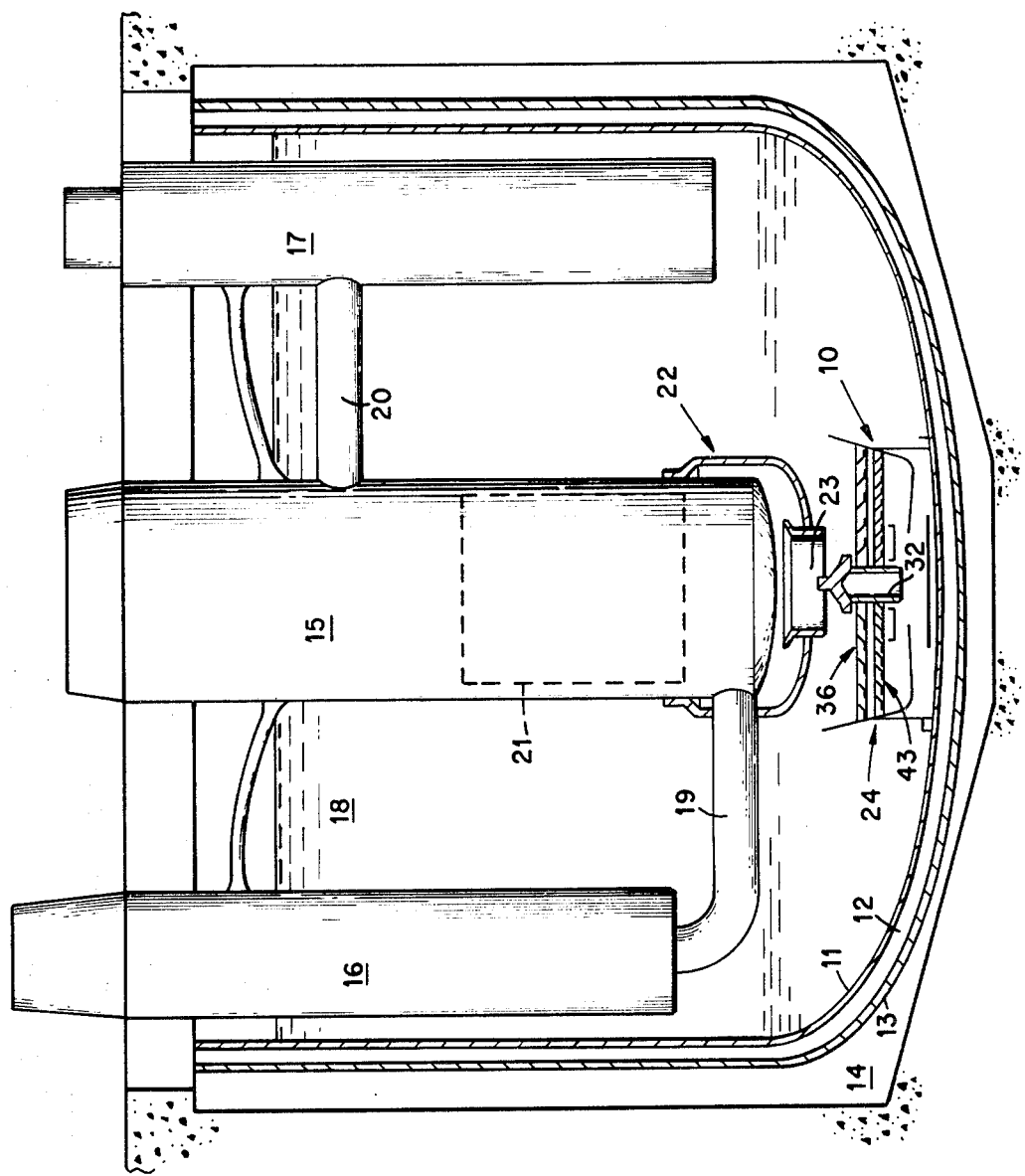
FIG. 1 is a view, partially in cross-section, schematically illustrating an embodiment of the invention positioned under the reactor assembly of a nuclear reactor.

The inventive nuclear fuel debris retention structure is illustrated schematically in FIG. 1, with this embodiment being illustrated in detail in FIGS. 2-6. As shown in FIG. 1, the debris retention structure, generally indicated at 10 is provided on the bottom of a primary containment tank 11 which is separated by a space 12, which may be filled with a suitable gas, from a secondary containment tank 13 positioned in a support structure 14, such as reinforced concrete. Positioned within the primary tank 11 is a centrally located reactor assembly generally indicated at 15, a pump assembly generally indicated at 16 on one side of reactor assembly 15, and a heat exchanger assembly generally indicated at 17 on the other side of reactor assembly 15. Primary tank 11 contains liquid sodium at elevated temperatures such as about 700°F, for example, indicated at 18, as the coolant about assemblies 15, 16 and 17. Pump assembly 16 is connected via conduit 19 to the lower end of reactor assembly 15 to force coolant upwardly through assembly 15 which is discharged into heat exchanger assembly 17 via conduit 20 for recirculation to pump assembly 16. Reactor assembly 15 contains, among other components, a reactor core indicated at 21 which contains nuclear fuel, as known in the art. Since the details of the primary tank 11, and assemblies 15, 16 and 17 do not constitute part of this invention a detailed description thereof is not deemed necessary. Connected to reactor assembly 15 is a structure generally indicated at 22 containing a centrally located funnel-like member 23 which serves to direct nuclear fuel debris falling from the lower end of reactor assembly 15 onto the fuel debris retention structure 10, while the outer portion of structure 22 serves to collect and retain debris.

Figure 2:
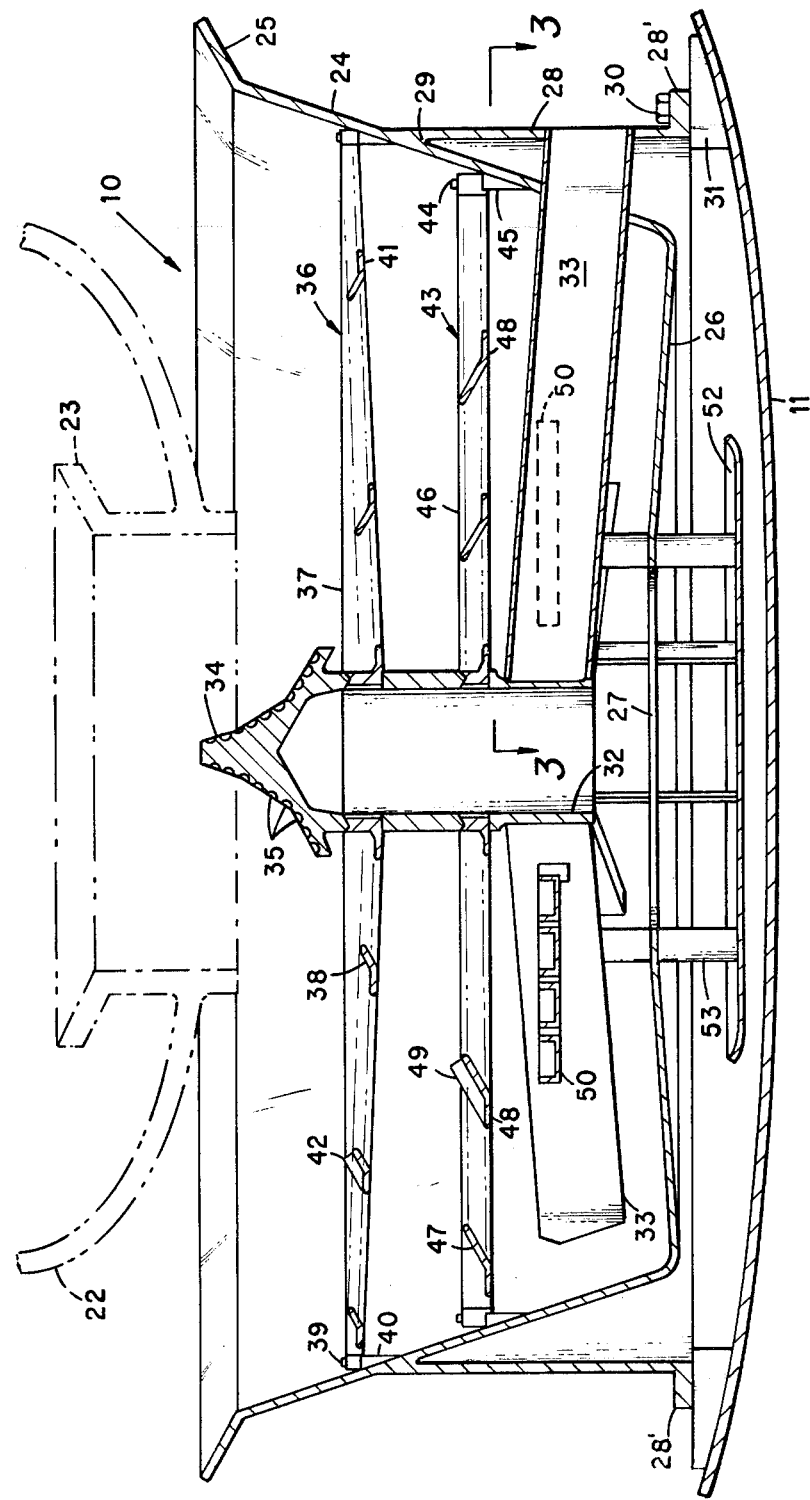
FIG. 2 is a cross-sectional view of the inventive fuel debris retention structure illustrated schematically in FIG. 1.
Figure 4:
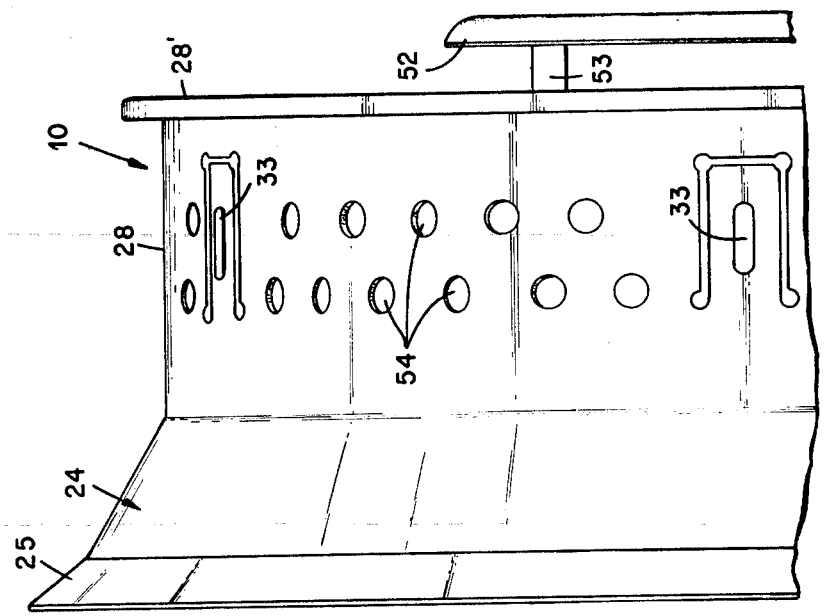
FIG. 4 is a side view of the FIG. 3 device.
Figure 3:
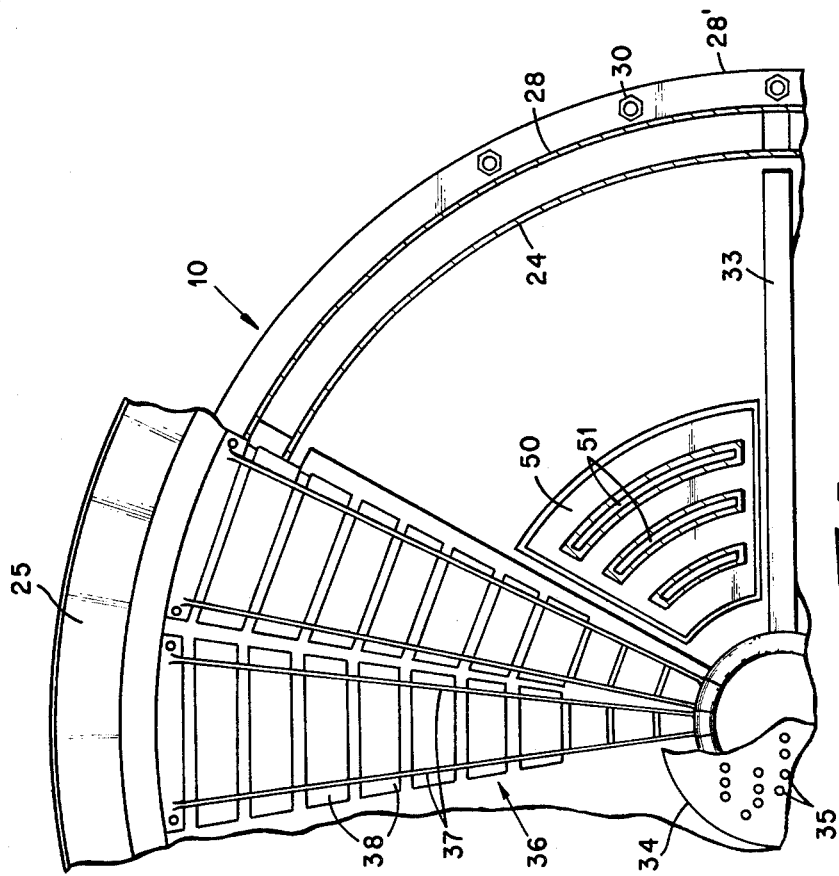
FIG. 3 is a partial plan view of the FIG. 2 structure with a portion cut away along line 3—3 of FIG. 2 to illustrate the interior thereof.

Referring now to FIGS. 2-6, debris retention structure 10 comprises an outer shell or housing 24 having an outwardly extending flange portion 25 and a bottom portion which defines an outer retention pan 26, outer retention pan 26 having a central opening 27 therein. Outer shell 24 is secured to the bottom of primary tank 11 by a support skirt 28, skirt 28 being connected to shell 24 as by welding indicated at 29 and to tank 11 via bolts 30 extending through a flange portion 28' of support skirt 28, tank 11 being provided with a support ring or member 31 to which bolts 30 are secured. A hollow central support structure 32 is positioned within outer shell 24 by a plurality of radial beams 33 which extend through shell 24 and are secured, as by welding, to support skirt 28. Central support structure 32 is closed at the upper end thereof by a cusp shaped impingement cone 34, cone 34 being provided on the outer surface thereof with a multiplicity of indentations 35 (see FIGS. 2 and 3), the function of cone 34 and indentations 35 being described in detail hereinbelow. A coarse grid structure, made up of small (15°) azimuthal segments, (see FIG. 3) is generally indicated at 36 with each section comprising a pair of radial supports 37 and a plurality of grid vanes 38, described in detail with respect to FIGS. 5 and 6, is secured intermediate central support structure 32, as by welding, and outer shell 24 via bolts 39 and a support flange 40 secured to shell 24. Each of grid vanes 38 includes a lower lip 41 which functions to support a pile of debris 42 as described hereinbelow. A fine grid structure generally indicated at 43 is located in spaced relationship below coarse grid structure 36, and is secured to central support structure 32, as by welding, and to outer shell 24 via bolts 44 and support flange 45. Fine grid structure 43, like coarse grid structure 36 is constructed of a plurality of radial supports 46 and grid vanes 47, each grid vane having a lower lip 48 which functions to support a pile of debris 49, grid vanes 47 being positioned closer together than the coarse grid vanes 38. While coarse grid structure retains fragments, for example, greater than about 2.5 inch diameter, fine grid structure retains fragments, for example, greater than about 1 inch diameter. Positioned in spaced relation about central structure 32, below fine grid structure 43 and secured intermediate radial beams 33, as seen in FIGS. 2 and 3, is a plurality of structure sections forming an upper retention pan 50 having slots 51 therein, pan 50 being greater in diameter than opening 27 in outer retention pan 26. A center retention pan 52 is positioned below outer retention pan 26 and secured to radial beams 33 via members 53, center pan 51 being of a larger diameter then opening 27 in outer pan 26. Pans 26, 50 and 52 function to collect the remaining debris which passes through fine grid structure 43, and, in this embodiment, limit the thickness of debris to about 2 inches which is adequate to prevent excessive temperature in either granular or solid debris. As seen in FIG. 4, support skirt 28 is provided with a multiplicity of apertures 54 through which coolant 18 passes as discussed hereinafter.

The coarse grid structure 36 is illustrated in detail in FIGS. 5 and 6 wherein radial supports 37 are integral with or attached at the inner ends (right hand side as shown) to an inner support member 55 while the outer ends thereof are integral with or attached to an outer support member 56; inner support member 55 being secured to central support structure 32 while outer support member 56 is secured via bolts 39 which pass through apertures 57 in members 56. As seen in FIG. 6 the grid vanes 38 are positioned at the approximate angle of repose of the fragmented material (20° to 40°), 30° in this embodiment as indicated at 58, with the extending lip portion thereof being substantial parallel to the lower surface of radial member 37.

Fuel debris emanates from the reactor assembly 15 following an accident which results in substantial melting of the nuclear core 21. This debris consists of fuel fragments and molten droplets which are primarily directed through member 22 and impinge on the retention structure 10. The falling fuel debris are intercepted by impingement cone 34. This impingement cone 34 provides for dispersion of the fuel material in two ways.

First, it deflects the fuel material by virtue of its cusp contour.

Second, the surfaces of the impingement cone 34 contains the small indentations 35 which entrap sodium under the debris, which vaporizes due to the heat generation in the debris and the inability of the entrapped sodium to dissipate the heat transferred to it from the debris. Since the vaporized sodium is entrapped its pressure is greatly increased resulting in a large force on the debris tending to project the debris radially from the impingement cone 34.

The motion of the debris caused by the sodium entrapped in indentations 35 is resisted by hydrodynamic drag on the debris by the sodium thereabout and the scattered debris falls on coarse grid structure 36 which performs the following functions:

First, it collects large fragments (greater than about 2½ inch diameter, for example) on the grid vanes 38. By virtue of the minimum support of the grid, the fragments are provided with excellent cooling by natural convection.

Second, the smaller debris is given an additional radial dispersion by the slope or angle of the vanes 38. Forming the grid structure 36 using the radially directed cross vanes 38 eliminates the problem associated with diverging radial support members 37 and this results in a uniform grid spacing and thus retention of uniform sized fragments.

Third, retains smaller debris on the vanes 38 by locating the vanes 38 at the approximate angle of repose of the fragmented material (20° to 40°) and extending the vane outwardly by radial lower lip 41 which acts to support a pile of debris 42 on the vane.

The thickness of the debris is limited by its angle of repose to a value which prevents excessive temperatures for either fragmented debris or a solid slab of fuel formed from the melt. Adequate natural convection cooling is provided through the vanes so that cooling occurs on both sides of the debris. The radial grid structure is made in small (15°) azimuthal segments so that thermal distortions will be minimized and will not cause distortions which might defect the structure.

The fine grid structure 43 has the same three functions and characteristics of the coarse grid structure 36 described above, however, it will retain all fragments greater than about 1 inch. Cooling for the fine grid 43 is provided in the same manner as the coarse grid 36.

The remaining debris is collected in the configuration of pan structures 26, 50 and 52 below the grid structure 43. These pans limit the thickness of debris to about 2 inches which is adequate to prevent excessive temperature in either granular or solid debris. The pans, as shown, are staggered to provide almost complete collection of the residual material. Any remaining material which might escape from the pans would be too small in size to cause a penetration problem on the primary tank.

Analysis of natural convection cooling by the sodium about fuel debris retention structure 10 has established that adequate heat dissipation can be accommodated. Nuclear criticality is prevented by limiting fuel material slab configuration to less than 6 inches thick and separating collected planes. All grid vanes and pans are supported in such a way as to accommodate thermal expansion and shock. The materials from which the structure 10 is made are compatible with the higher temperature sodium environment. Separate cooling is provided through the radial beams 33 to minimize thermal expansion of the members and provide adequate cooling of the structural support. The retention structure is capable of accumulating about three times the debris thus allowing for the possibility of eccentric loading.

It has been shown that the present invention constitutes an advancement in the state of the art by providing the following unique features:

1. The retention structure provides for the disbursement of fuel debris by the expulsion action of the vaporization of entrapped sodium within the indentations in the cusp shaped impingement cone.
2. The grid structure provides for nearly all-around cooling for larger chunks of falling debris.
3. The contour and direction of the grid vanes provide for radial disbursement of the falling fuel debris.
4. The shape of the grids allow for the accumulation of finer debris and molten material taking advantage of the angle of repose of the material in such a way as to provide adequate cooling by natural convection.
5. The structure provides separate cooling to primary structural supporting members to guarantee structural integrity.

While a particular embodiment of the invention has been illustrated and described, modifications and changes will become apparent to those skilled in the art, and it is intended to cover in the appended claims all such modifications as come within the spirit and scope of the invention.

What is claimed is:

1. A nuclear fuel debris retention structure which functions for the dispersion, collection and cooling of fuel debris adapted to be positioned within a nuclear reactor and below the core thereof containing nuclear fuel elements comprising: a central structure having an impingement cone means at the upper end thereof, said cone means being provided with indentations on the upper surface thereof for entrapping coolant therein, a first grid structure positioned below said impingement cone means and extending radially outward from and secured to said central structure, said first grid structure including a plurality of selectively spaced vane means positioned at an angle with respect to said central structure, a second grid structure positioned below said first grid structure and extending radially outward from and secured to said central structure, said second grid structure including a plurality of selectively spaced vane means positioned at an angle with respect to said central structure, said vane means of said second grid structure being located at a smaller distance from each other than the vane means of said first grid structure, said vane means of each of said first and second grid structures including an outwardly extending lower end portion, and pan means positioned below said second grid structure.

2. The fuel debris retention structure defined in claim 1, additionally including a shell means, the outer portion of said first and second grid structures being secured to said shell means, and a plurality of radially extending beam-like means secured at one end thereof to central structure and at the opposite end thereof to a support means, said support means being secured to said shell means.

3. The fuel debris retention structure defined in claim 2, wherein said pan means comprises three pan-like means, one of said pan-like members being formed by a portion of said shell means and having a centrally located opening therein, a second of said pan means being positioned about the lower section of said central structure and intermediate said second grid structure and said one of said pan-like members, and a third of said pan means being positioned below said one of said pan-like members and in alignment with said centrally located opening in said one of said pan-like members.

4. The fuel debris retention structure defined in claim 1, wherein said pan means comprises a plurality of pan members of different cross-sectional area and positioned in a spaced overlapping relationship with one another.

5. The fuel debris retention structure defined in claim 1, wherein each of said first and second grid structures is composed of a plurality of sections, each of said sections containing a specified number of said vane means mounted on spaced radial support means.

6. The fuel debris retention structure defined in claim 5, wherein said vane means are mounted on said radial support means at an angle of about 20° to 40° with respect to said radial support means.

7. The fuel debris retention structure defined in claim 1, additionally including an outer shell means having a partially closed lower end portion, said first and second grid structures being positioned within and secured to said outer shell means, and support skirt means positioned about at least the lower portion of said outer shell means and secured thereto, said support skirt means extending below said lower end portion of said outer shell means.

8. The fuel debris retention structure defined in claim 7, wherein said pan means includes said partially closed lower end portion of said outer shell means, and a pair of pan-like members positioned on opposite sides of said partially closed lower end portion of said outer shell means.

9. The fuel debris retention structure defined in claim 7, wherein said outer shell means is provided with a plurality of apertures through which coolant is adapted to pass.

10. The fuel debris retention structure defined in claim 1, in combination with a nuclear reactor comprising a pressure vessel containing at least a primary tank, a reactor assembly located within said primary tank containing at least a core means having nuclear fuel elements therein, and coolant contained within said primary tank and surrounding at least said fuel debris retention structure and said core means, said retention structure being secured within said primary tank at a position directly below said core means, and means for directing fuel debris from said reactor assembly onto said retention structure.

* * * * *